(12) United States Patent
Ikeda

(10) Patent No.: US 11,552,314 B2
(45) Date of Patent: Jan. 10, 2023

(54) FUEL CELL SYSTEM

(71) Applicant: TOYOTA JIDOSHA KABUSHIKI KAISHA, Toyota (JP)

(72) Inventor: Koichiro Ikeda, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 17/353,048

(22) Filed: Jun. 21, 2021

(65) Prior Publication Data

US 2021/0408564 A1 Dec. 30, 2021

(30) Foreign Application Priority Data

Jun. 26, 2020 (JP) .............................. JP2020-110692

(51) Int. Cl.
| | | |
|---|---|---|
| *H01M 8/04* | (2016.01) | |
| *H01M 8/04537* | (2016.01) | |
| *H01M 8/2465* | (2016.01) | |
| *H01M 8/0432* | (2016.01) | |
| *H01M 8/04089* | (2016.01) | |
| *H01M 8/1004* | (2016.01) | |

(52) U.S. Cl.
CPC ... *H01M 8/04544* (2013.01); *H01M 8/04089* (2013.01); *H01M 8/04365* (2013.01); *H01M 8/04574* (2013.01); *H01M 8/2465* (2013.01); *H01M 8/1004* (2013.01)

(58) Field of Classification Search
CPC ......... H01M 8/04544; H01M 8/04089; H01M 8/04365; H01M 8/04574
See application file for complete search history.

(56) References Cited

U.S. PATENT DOCUMENTS

2012/0276460 A1* 11/2012 Kumei ............. H01M 8/04432
429/429

FOREIGN PATENT DOCUMENTS

| JP | 2006-294402 A | 10/2006 |
| JP | 2016-031841 A | 3/2016 |
| WO | WO 2015/170416 A1 | 11/2015 |

\* cited by examiner

*Primary Examiner* — Olatunji A Godo
(74) *Attorney, Agent, or Firm* — Finnegan, Henderson, Farabow, Garrett & Dunner, LLP

(57) ABSTRACT

To provide a fuel-efficient fuel cell system configured to eliminate flooding in a fuel-based gas flow path, etc. The fuel cell system is a fuel cell system comprising a first fuel cell stack, a second fuel cell stack, a fuel gas supplier, a first supply flow path, a first circulation flow path, a second supply flow path, a second circulation flow path, a first bypass flow path which includes a first on-off valve, a second bypass flow path which includes a second on-off valve, a temperature detector, a current detector, a voltage detector and a controller.

3 Claims, 2 Drawing Sheets

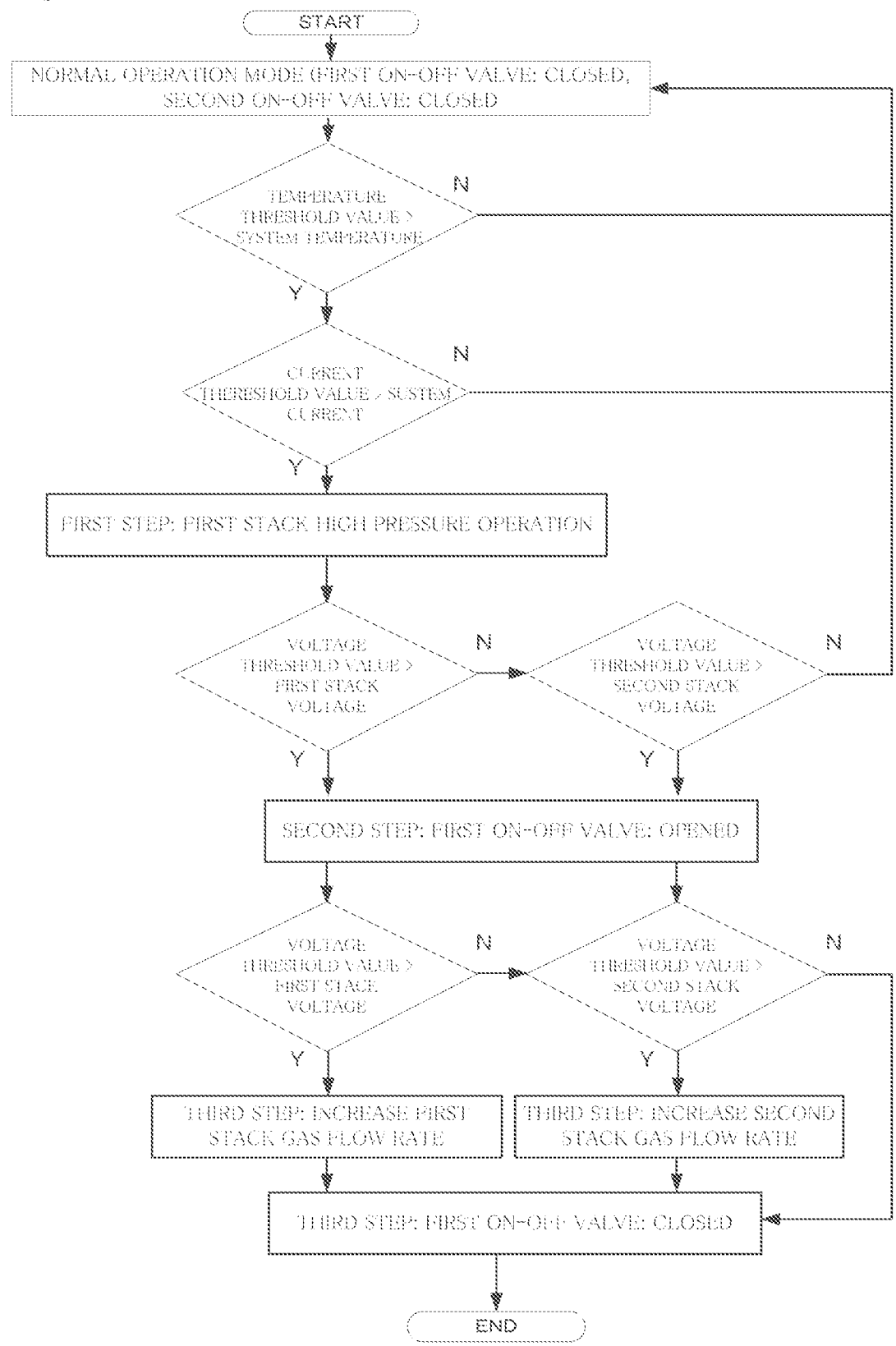

FUEL CELL SYSTEM

TECHNICAL FIELD

The disclosure relates to a fuel cell system.

BACKGROUND

A fuel cell (FC) is a power generation device that generates electrical energy by electrochemical reaction between hydrogen ($H_2$), which serves as fuel gas, and oxygen ($O_2$), which serves as oxidant gas, in a fuel cell stack (hereinafter, it may be simply referred to as "stack") composed of stacked unit fuel cells (hereinafter may be referred to as cells). Hereinafter, fuel gas and oxidant gas may be collectively and simply referred to as "reaction gas" or "gas".

In general, the unit fuel cells are composed of a membrane electrode assembly (MEA) and, as needed, two separators sandwiching the membrane electrode assembly.

The membrane electrode assembly has such a structure, that a catalyst layer and a gas diffusion layer are formed in this order on both surfaces of a solid polymer electrolyte membrane having proton ($H^+$) conductivity (hereinafter, it may be simply referred to as "electrolyte membrane").

In general, the separators have a structure that a groove is formed as a reaction gas flow path on a surface in contact with the gas diffusion layer. The separators function as a collector of generated electricity.

In the fuel electrode (anode) of the fuel cell, the hydrogen supplied from the gas flow path and the gas diffusion layer is protonated by the catalytic activity of the catalyst layer, and the protonated hydrogen goes to the oxidant electrode (cathode) through the electrolyte membrane. An electron is generated at the same time, and it passes through an external circuit, do work, and then goes to the cathode. The oxygen supplied to the cathode reacts with the proton and electron on the cathode, thereby generating water.

The generated water provides the electrolyte membrane with appropriate moisture. Redundant water penetrates the gas diffusion layer and then is discharged to the outside of the system.

There has been considerable research on a fuel cell system which is installed and used in a fuel cell vehicle (hereinafter may be simply referred to as "vehicle").

For example, Patent Literature 1 discloses a fuel cell system which includes stacks and a discharge gas passage connected thereto and which enables the discharge of water accumulated in the first inner reaction gas flow passage of the first fuel cell stack by utilizing the kinetic energy of exhaust gas from the second inner reaction gas flow passage of the second fuel cell stack.

Patent Literature 2 discloses a fuel cell system in which the oxidation of a cell stack in a non-power generation state is prevented by supplying anode-off gas to the cell stack in the non-power generation state.

Patent Literature 3 discloses a fuel cell system including a pulsing control unit that makes an anode-gas pressure vary in a pulsing manner.

Patent Literature 1: Japanese Patent Application Laid-Open (JP-A) No. 2006-294402

Patent Literature 2: JP-A No. 2016-031841

Patent Literature 3: International Publication No. WO2015-170416

If the water generated by the power generation of a fuel cell, accumulates in a fuel-based gas flow path and so on and puts them in a flooding state, the power generation of the fuel cell may fail. Accordingly, it is needed to efficiently discharge the water from the fuel-based gas flow path and so on without a reduction in fuel efficiency.

The fuel cell system of Patent Literature 1 uses, as a driving force to generate kinetic energy, the driving force (suction) of a turbine disposed on the gas discharge side of each stack. Flooding is likely to occur when the fuel cell is used in a low current range. Since the low current range is a power generation range where a discharged gas pressure is low, a pressure difference between the inlet and outlet of the fuel cell cannot be increased. To generate kinetic energy, accordingly it is needed to increase the suction by forcibly rotating the turbine. As a result, there is a possibility of excess power consumption and a deterioration in the fuel efficiency of a vehicle, etc.

The fuel cell system of the Patent Literature 2 is left in a steady state by just supplying the anode off-gas from one stack to the other stack. Accordingly, it cannot serve as a means to enhance the water discharge properties of a fuel-based gas flow path and so on.

In the fuel cell system of Patent Literature 3, the pulsing control unit adjusts the pulse amplitude of the anode-gas pressure on the basis of the temperature of the anode gas upstream of an ejector. However, pulse generation may be caused by supplying the anode gas to the fuel cell when the discharged gas pressure of the fuel cell is at a low level. Accordingly, it is difficult to cause pulse generation at a desired time.

SUMMARY

The disclosed embodiments were achieved in light of the above circumstances. An object of the disclosed embodiments is to provide a fuel-efficient fuel cell system configured to eliminate flooding in a fuel-based gas flow path, etc.

In a first embodiment, there is provided a fuel cell system comprising:

a first fuel cell stack, a second fuel cell stack, a fuel gas supplier which supplies fuel gas to the first and second fuel cell stacks, a first supply flow path which connects the fuel gas supplier and the first fuel cell stack, a first circulation flow path which recovers first fuel off-gas discharged from fuel electrodes of the first fuel cell stack and returns the first fuel off-gas as first circulation gas to the first fuel cell stack, a second supply flow path which connects the fuel gas supplier and the second fuel cell stack, a second circulation flow path which recovers second fuel off-gas discharged from fuel electrodes of the second fuel cell stack and returns the second fuel off-gas as second circulation gas to the second fuel cell stack, a first bypass flow path which includes a first on-off valve and which enables that it connects the first circulation flow path and the second supply flow path, bypasses the first fuel cell stack and supplies the first circulation gas to the second fuel cell stack, a second bypass flow path which includes a second on-off valve and which enables that it connects the second circulation flow path and the first supply flow path, bypasses the second fuel cell stack and supplies the second circulation gas to the first fuel cell stack, a temperature detector which detects a system temperature, a current detector which detects a system current, a voltage detector which detects a stack voltage, and a controller, wherein the controller closes the first and second on-off valves in a normal operation mode;

wherein the controller executes a first step in which, when the system temperature is less than a predetermined temperature and the system current is less than a predetermined threshold value, any one of the first and second fuel cell stacks is operated for a predetermined time at a higher gas pressure than the other fuel cell stack; and wherein the controller executes a second step in which, when the stack voltage of at least any one of the first and second fuel cell stacks is below a predetermined voltage value after the first step, the first on-off valve is opened if the fuel cell stack operated at the higher gas pressure in the first step is the first fuel cell stack, and the second on-off valve is opened if the fuel cell stack operated at the higher gas pressure in the first step is the second fuel cell stack.

The fuel cell stack operated at the higher gas pressure in the first step, may be the fuel cell stack which has a shorter history of operation at a high gas pressure.

The controller may execute a third step in which a gas flow rate of the first fuel cell stack is increased when the voltage of the first fuel cell stack is below the predetermined voltage value after the second step, and a gas flow rate of the second fuel cell stack is increased when the voltage of the second fuel cell stack is below the predetermined voltage value after the second step, and then the on-off valve opened in the second step is closed.

The fuel-efficient fuel cell system of the disclosed embodiments can eliminate flooding in the fuel-based gas flow path, etc.

BRIEF DESCRIPTION OF THE DRAWINGS

In the accompanying drawings,

FIG. 2 is the flow chart of an example of the method for controlling the fuel cell system according to the disclosed embodiments.

DETAILED DESCRIPTION

Figure 1:
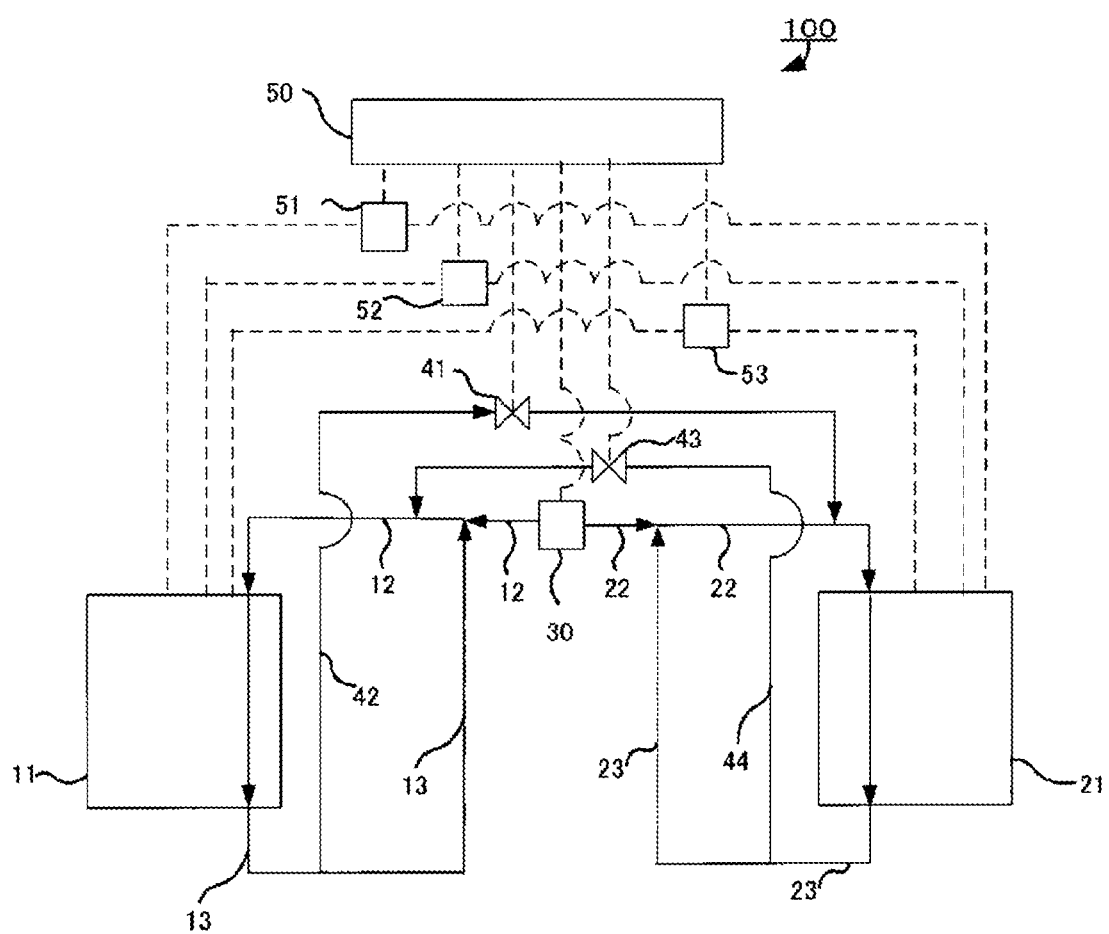
FIG. 1 is a schematic configuration diagram of an example of the fuel cell system according to the disclosed embodiments.

The fuel cell system of the disclosed embodiments is a fuel cell system comprising:
a first fuel cell stack,
a second fuel cell stack,
a fuel gas supplier which supplies fuel gas to the first and second fuel cell stacks,
a first supply flow path which connects the fuel gas supplier and the first fuel cell stack,
a first circulation flow path which recovers first fuel off-gas discharged from fuel electrodes of the first fuel cell stack and returns the first fuel off-gas as first circulation gas to the first fuel cell stack,
a second supply flow path which connects the fuel gas supplier and the second fuel cell stack,
a second circulation flow path which recovers second fuel off-gas discharged from fuel electrodes of the second fuel cell stack and returns the second fuel off-gas as second circulation gas to the second fuel cell stack,
a first bypass flow path which includes a first on-off valve and which enables that it connects the first circulation flow path and the second supply flow path, bypasses the first fuel cell stack and supplies the first circulation gas to the second fuel cell stack,
a second bypass flow path which includes a second on-off valve and which enables that it connects the second circulation flow path and the first supply flow path, bypasses the second fuel cell stack and supplies the second circulation gas to the first fuel cell stack,
a temperature detector which detects a system temperature,
a current detector which detects a system current,
a voltage detector which detects a stack voltage, and
a controller,
wherein the controller closes the first and second on-off valves in a normal operation mode;

wherein the controller executes a first step in which, when the system temperature is less than a predetermined temperature and the system current is less than a predetermined threshold value, any one of the first and second fuel cell stacks is operated for a predetermined time at a higher gas pressure than the other fuel cell stack; and wherein the controller executes a second step in which, when the stack voltage of at least any one of the first and second fuel cell stacks is below a predetermined voltage value after the first step, the first on-off valve is opened if the fuel cell stack operated at the higher gas pressure in the first step is the first fuel cell stack, and the second on-off valve is opened if the fuel cell stack operated at the higher gas pressure in the first step is the second fuel cell stack.

Once flooding is caused by the water accumulated in the fuel-based gas flow path, etc., a shortage of the fuel-based gas supplied to the fuel cell, is caused. As a result, an irreversible deterioration of the fuel cell occurs.

The term "fuel-based gas" encompasses fuel gas, fuel off-gas and mixed gas containing fuel gas and circulation gas. The term "fuel-based gas flow path" encompasses fuel gas supply flow path, fuel off-gas discharge flow path, circulation flow path, anode inlet manifold, anode outlet manifold and so on.

In the power generation of the fuel cell in a low current range, due to a low flow rate of the fuel-based gas, flooding is likely to occur in flow paths such as the fuel-based gas flow path. Since the water in the fuel-based gas flow path can be the cause for flooding, it is effective to discharge the water by producing a pressure difference (pulse) between the lower portion of the fuel-based gas flow path (such as the fuel off-gas discharge flow path) and the upper portion of the fuel-based gas flow path (such as the fuel gas supply flow path).

However, as described above, in the prior art, it is difficult to cause pulse generation at a desired time.

Another pulse generation method may be the following method, for example: fuel off-gas is temporarily discharged by operating the fuel cell when the pressure of the fuel-based gas flow path is at a relatively high level compared to the normal operation of the fuel cell. In this method, however, fuel is wastefully discharged, thereby lowering the fuel efficiency of a vehicle, etc.

Another pulse generation method may be the following method, for example: high-pressure fuel gas is temporarily supplied by operating the fuel cell when the pressure of the fuel-based gas flow path is at a relatively low level compared to the normal operation of the fuel cell. However, since the fuel cell operation at a low pressure is fuel cell operation in a low current range, there are problems of poor fuel gas distribution between the unit cells of the stack, which is due to a low flow rate of the fuel gas, and a fuel gas shortage of the whole stack, which is due to low fuel gas partial pressure.

According to the disclosed embodiments, the fuel gas supply flow path and circulation flow path of the two stacks are connected by the on-off bypass flow paths, and the stacks are operated so that when one of the stacks may fall into a flooding state, a fuel-based gas pressure difference is produced between the stacks without using power.

Then, when one of the stacks falls into a flooding state, the stacks are connected by the bypass flow paths, and the flow rate of the fuel-based gas is increased by the fuel-based gas pressure difference between the stacks. Thereby, the water accumulated in the flow path is discharged.

According to the disclosed embodiments, while excess power consumption for water discharge is reduced, only the fuel-based gas flow rate is controlled even when a pressure difference is produced between the inlet and outlet of the fuel cell, and a fuel shortage due to the flooding of the two stacks can be suppressed without the use of excess fuel gas.

According to the disclosed embodiments, the circulation gas flow rate of one of the two stacks, which is a stack in which the pressure is decreased, may be increased. Accordingly, it is possible to suppress a fuel gas shortage due to poor fuel gas distribution between the fuel electrodes of the unit cells of the stacks, which is caused by a decrease in the partial pressure of the fuel electrodes. In addition, according to the gas state equation, the mole number of reacted gas is not changed by a pressure decrease. Accordingly, there is little possibility that the power generation efficiency of the fuel cell will decrease.

In the disclosed embodiments, a flooding elimination time is about 20 to 30 seconds, for example, and it may be longer than the flooding elimination time of Patent Literature 1, which is a time needed to eliminate flooding by turbine ON. In the disclosed embodiments, however, flooding occurs on a timescale of about several minutes. Accordingly, if a pressure difference is produced between the inlet and outlet of the fuel cell in the step 1, which is a time-consuming step, in preparation for flooding, flooding can be quickly eliminated by pressure release in the step 2.

FIG. 1 is a schematic configuration diagram of an example of the fuel cell system according to the disclosed embodiments.

A fuel cell system 100 shown in FIG. 1 includes the following: a first fuel cell stack 11, a first supply flow path 12, a first circulation flow path 13, a second fuel cell stack 21, a second supply flow path 22, a second circulation flow path 23, a fuel gas supplier 30, a first bypass flow path 42 which includes a first on-off valve 41, a second bypass flow path 44 which includes a second on-off valve 43, a controller 50, a temperature detector 51, a current detector 52 and a voltage detector 53.

The fuel gas supplier 30, the first on-off valve 41, the second on-off valve 43, the temperature detector 51, the current detector 52 and the voltage detector 53 are electrically connected to the controller 50. The controller 50 controls the fuel gas supplier 30, the first on-off valve 41 and the second on-off valve 43.

The fuel cell system of the disclosed embodiments includes at least the following: the first fuel cell stack, the second fuel cell stack, the fuel gas supplier, the first supply flow path, the first circulation flow path, the second supply flow path, the second circulation flow path, the first bypass flow path which includes the first on-off valve, the second bypass flow path which includes the second on-off valve, the temperature detector, the current detector, the voltage detector and the controller. In general, the fuel cell system further includes an oxidant gas supplier, an oxidant gas supply flow path, an oxidant gas discharge flow path, a cooling water supplier, a cooling water circulation flow path, etc.

In general, the fuel cell system of the disclosed embodiments is installed and used in a fuel cell vehicle that uses a motor as a driving source.

The motor is not particularly limited. It may be a conventionally-known motor.

As fuel cell stacks, the fuel cell system of the disclosed embodiments includes the first fuel cell stack and the second fuel cell stack.

Each of the first and the second fuel cell stacks is composed of stacked unit fuel cells.

The number of the stacked unit fuel cells of each fuel cell stack is not particularly limited. For example, two to several hundred unit fuel cells may be stacked, or 2 to 200 unit fuel cells may be stacked.

The number of the stacked unit fuel cells of the first fuel cell stack may be the same as or different from that of the second fuel cell stack.

Each fuel cell stack may include an end plate at both stacking-direction ends of each unit fuel cell.

Each unit fuel cell includes at least a membrane electrode assembly including an oxidant electrode, an electrolyte membrane and a fuel electrode. As needed, it may include two separators sandwiching the membrane electrode assembly.

The separators may have a reaction gas flow path on a surface in contact with a gas diffusion layer. Also, on an opposite surface to the surface in contact with the gas diffusion layer, the separators may have a cooling water flow path for keeping the temperature of each fuel cell stack at a constant level.

The separators may have supply and discharge holes for delivering reaction gas and cooling water in the unit cell stacking direction.

As the supply hole, examples include, but are not limited to, a fuel gas supply hole, an oxidant gas supply hole and a cooling water supply hole.

As the discharge hole, example include, but are not limited to, a fuel gas discharge hole, an oxidant gas discharge hole and a cooling water discharge hole.

The separators may be a gas-impermeable, electroconductive member, etc. As the electroconductive member, examples include, but are not limited to, gas-impermeable dense carbon obtained by carbon densification, and a metal plate (such as an iron plate, an aluminum plate and a stainless-steel plate) obtained by press molding. The separators may have a current collection function.

Each fuel cell stack may have a manifold such as an inlet manifold communicating between supply holes and an outlet manifold communicating between discharge holes.

As the inlet manifold, examples include, but are not limited to, an anode inlet manifold, a cathode inlet manifold and a cooling water inlet manifold.

As the outlet manifold, examples include, but are not limited to, an anode outlet manifold, a cathode outlet manifold and a cooling water outlet manifold.

The oxidant electrode includes an oxidant electrode catalyst layer and a gas diffusion layer.

The fuel electrode includes a fuel electrode catalyst layer and a gas diffusion layer.

The oxidant electrode catalyst layer and the fuel electrode catalyst layer may contain a catalyst metal for accelerating an electrochemical reaction, a proton-conducting electrolyte, or electron-conducting carbon particles, for example.

As the catalyst metal, for example, platinum (Pt) or an alloy of Pt and another metal (such as Pt alloy mixed with cobalt, nickel or the like) may be used.

The electrolyte may be fluorine resin or the like. As the fluorine resin, for example, a Nafion solution may be used.

The catalyst metal is supported on carbon particles. In each catalyst layer, the carbon particles supporting the catalyst metal (i.e., catalyst particles) and the electrolyte may be mixed.

As the carbon particles for supporting the catalyst metal (i.e., supporting carbon particles), for example, water repellent carbon particles obtained by enhancing the water repellency of commercially-available carbon particles (carbon powder) by heating, may be used.

The gas diffusion layer may be a gas-permeable, electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a moisture-containing, thin perfluorosulfonic acid membrane. The electrolyte membrane may be a Nafion membrane (manufactured by DuPont), for example.

The fuel gas supplier supplies fuel gas to the first and second fuel cell stacks.

The fuel gas is gas that mainly contains hydrogen. For example, it may be hydrogen gas.

As the fuel gas supplier, examples include, but are not limited to, a fuel tank such as a liquid hydrogen tank and a compressed hydrogen tank.

The fuel gas supplier may be electrically connected to the controller to be able to control the fuel gas flow rate of the fuel cell stack in which the fuel gas supplier supplies the fuel gas by a signal from the controller.

As fuel gas supply flow paths, the fuel cell system of the disclosed embodiments includes the first supply flow path and the second supply flow path.

The first supply flow path connects the fuel gas supplier and the first fuel cell stack.

The first supply flow path connects the fuel gas supplier and the fuel-based gas inlet (e.g., the anode inlet manifold) of the first fuel cell stack to enable the supply of the fuel gas from the fuel gas supplier to the first fuel cell stack.

The second supply flow path connects the fuel gas supplier and the second fuel cell stack.

The second supply flow path connects the fuel gas supplier and the fuel-based gas inlet (e.g., the anode inlet manifold) of the second fuel cell stack to enable the supply of the fuel gas from the fuel gas supplier to the second fuel cell stack.

As circulation flow paths, the fuel cell system of the disclosed embodiments includes the first circulation flow path and the second circulation flow path.

The first circulation flow path connects the fuel off-gas discharge hole (e.g., the anode outlet manifold) of the first fuel cell stack and the first supply flow path and enables that it recovers the first fuel off-gas discharged from the fuel electrodes of the first fuel cell stack and returns the first fuel off-gas as the first circulation gas to the first fuel cell stack.

The second circulation flow path connects the fuel off-gas discharge hole (e.g., the anode outlet manifold) of the second fuel cell stack and the second supply flow path and enables that it recovers the second fuel off-gas discharged from the fuel electrodes of the second fuel cell stack and returns the second fuel off-gas as the second circulation gas to the second fuel cell stack.

Each of the first fuel off-gas and the second fuel off-gas mainly contains fuel gas, which passed through the fuel electrodes while remaining unreacted, and moisture, which is water generated at the oxidant electrodes and delivered to the fuel electrodes.

A gas-liquid separator may be installed in each of the first and second circulation flow paths, which is used for the removal of condensed water generated by cooling the water vapor of the fuel off-gas in each circulation flow path. Also, a drain flow path, which branches off from each circulation flow path by the gas-liquid separator, may be installed in each circulation flow path, and a drain valve may be installed in the drain flow path.

In the gas-liquid separator, the removed condensed water may be discharged by opening the drain valve of the drain flow path branching off from each circulation flow path.

Also, each circulation flow path may be provided with, for example, an ejector and a circulation pump for efficient supply of the circulation gas to the fuel cell stacks, such as a hydrogen pump.

The ejector supplies the mixed gas containing the fuel gas and the circulation gas to the fuel electrodes of each fuel cell stack. As the ejector, a conventionally-known ejector may be used.

An injector may be provided between the ejector of each fuel gas supply flow path and the fuel gas supplier.

The injector controls the gas pressure of the fuel gas supplied to the ejector.

As bypass flow paths, the fuel cell system of the disclosed embodiments includes the first bypass flow path and the second bypass flow path.

The first bypass flow path includes the first on-off valve and enables that it connects the first circulation flow path and the second supply flow path, bypasses the first fuel cell stack and supplies the first circulation gas to the second fuel cell stack.

The second bypass flow path includes the second on-off valve and enables that it connects the second circulation flow path and the first supply flow path, bypasses the second fuel cell stack and supplies the second circulation gas to the first fuel cell stack.

The fuel cell system may include a fuel off-gas discharger.

The fuel off-gas discharger may discharge the fuel off-gas, in which the concentration of the fuel gas is equal to or less than the predetermined concentration, to the outside. The outside means the outside of the fuel cell system.

The fuel off-gas discharger may include a fuel off-gas discharge valve. As needed, it may further include a fuel off-gas discharge flow path.

The fuel off-gas discharge valve controls the fuel off-gas discharge flow amount.

The fuel off-gas discharge flow path may branch off from each circulation flow path.

The fuel off-gas discharger may discharge the fuel off-gas to the outside when, for example, the concentration of the fuel gas such as hydrogen in the fuel off-gas is equal to or less than the predetermined concentration. The predetermined concentration of the fuel gas is not particularly limited and may be appropriately determined considering the fuel efficiency of the fuel cell system, for example.

The method for detecting the concentration of the fuel gas in the fuel off-gas is not particularly limited. For example, a conventionally-known concentration sensor may be used.

The temperature detector detects the system temperature. The system temperature may be the temperature of any position in the fuel cell system, or it may be the average of the temperature of cooling water circulating in and out of the first and second fuel cell stacks. Also, the temperature of the fuel cell stacks may be the temperature of cooling water flowing around the cooling water inlet of the fuel cell stacks, or it may be the temperature of cooling water flowing around the cooling water outlet of the fuel cell stacks.

As the temperature detector, examples include, but are not limited to, a temperature sensor.

The current detector detects the system current. The system current may be the current of any position in the fuel cell system, or it may be the average of the current flowing through each of the first and second fuel cell stacks.

As the current detector, examples include, but are not limited to, a current sensor.

The voltage detector detects the stack voltage. The voltage detector detects the voltage of each of the first and second fuel cell stacks.

As the voltage detector, examples include, but are not limited to, a voltage sensor.

The fuel cell system may include the oxidant gas supplier, the oxidant gas supply flow path, and the oxidant gas discharge flow path.

The oxidant gas supplier supplies oxidant gas to at least the oxidant electrodes of the fuel cell stacks.

As the oxidant gas supplier, for example, an air compressor may be used. The air compressor is driven by a control signal from the controller and introduces the oxidant gas to the cathode side (such as the oxidant electrode and the cathode inlet manifold) of the fuel cell.

The oxidant gas supply flow path enables that it connects the oxidant gas supplier and the fuel cell stacks and supplies oxidant gas from the oxidant gas supplier to the oxidant electrodes of the fuel cell stacks.

The oxidant gas is oxygen-containing gas. It may be air, dry air, pure oxygen or the like.

The oxidant gas discharge flow path enables the discharge of the oxidant gas from the oxidant electrodes of the fuel cell stacks.

The fuel cell system may include a cooling water supplier and a cooling water circulation flow path.

The cooling water circulation flow path enables that it communicates between the cooling water inlet manifold and cooling water outlet manifold installed in the fuel cell stacks, circulates the cooling water supplied from the cooling water supplier in and out of the fuel cell stacks, and cools down the fuel cell stacks.

As the cooling water supplier, examples include, but are not limited to, a cooling water pump.

As the cooling water (refrigerant), for example, a mixed solution of ethylene glycol and water may be used to prevent freezing at low temperatures.

The controller controls the fuel cell system.

The controller may be connected to the temperature detector, the current detector, the voltage detector, the fuel gas supplier, the fuel off-gas discharger, the oxidant gas supplier and so on through an input-output interface.

The controller physically includes a processing unit such as a central processing unit (CPU), a memory device such as a read-only memory (ROM) and a random access memory (RAM), and the input-output interface, for example. The ROM is used to store a control program, control data and so on processed by the CPU, and the RAM is mainly used as various workspaces for control processes. Also, the controller may be a control device such as an engine control unit (ECU).

The controller closes the first and second on-off valves and executes the normal operation mode of operating the fuel cell stacks, the first step, the second step, the third step, etc.

FIG. 2 is the flow chart of an example of the method for controlling the fuel cell system according to the disclosed embodiments. The disclosed embodiments are not limited to this typical example.

In the control method shown in FIG. 2, first, the controller closes the first and second on-off valves and executes the normal operation mode.

Then, the controller executes the first step in which, when the system temperature is less than the predetermined temperature (the threshold value of the temperature) and the system current is less than the predetermined threshold value (the threshold value of the current), the first fuel cell stack is operated for the predetermined time at the higher gas pressure than the second fuel cell stack. When the second fuel cell stack has a shorter history of operation at a high pressure than the first fuel cell stack, the second fuel cell stack may be operated for the predetermined time at the higher gas pressure than the first fuel cell stack. On the other hand, when the system temperature is equal to or more than the predetermined temperature (the threshold value of the temperature) and/or the system current is equal to or more than the predetermined threshold value (the threshold value of the current), the controller continues the normal operation mode.

Then, the controller executes the second step in which, when the stack voltage of at least any one of the first and second fuel cell stacks is below the predetermined voltage value (the threshold value of the voltage) after the first step, the first on-off valve is opened. When the voltage of both the first and second fuel cell stacks is equal to or more than the predetermined voltage value (the threshold value of the voltage), the fuel cell stacks return to the normal operation mode.

Then, the controller executes the third step in which the gas flow rate of the first fuel cell stack is increased when the voltage of the first fuel cell stack is below the predetermined voltage value (the threshold value of the voltage) after the second step, and the gas flow rate of the second fuel cell stack is increased when the voltage of the second fuel cell stack is below the predetermined voltage value (the threshold value of the voltage) after the second step, and then the first on-off valve opened in the second step is closed. On the other hand, when the voltage of both the first and second fuel cell stacks is equal to or more than the predetermined voltage value (the threshold value of the voltage), the first on-off valve opened in the second step is closed, and the fuel cell stacks return to the normal operation mode. When the voltage of only the first fuel cell stack is below the predetermined voltage value (the threshold value of the voltage), the gas flow rate of only the first fuel cell stack is increased, and the gas flow rate of the second fuel cell stack is not increased; then, the first on-off valve opened in the second step is closed; the fuel cell stacks return to the normal operation mode; and the controller terminates the control. Also, when the voltage of only the second fuel cell stack is below the predetermined voltage value (the threshold value of the voltage), the gas flow rate of only the second fuel cell stack is increased, and the gas flow rate of the first fuel cell stack is not increased; then, the first on-off valve opened in the second step is closed; the fuel cell stacks return to the normal operation mode; and the controller terminates the control.

(1) First Step

The first step executed by the controller is the following step: in the normal operation mode in which the controller closes the first and second on-off valves and operates the fuel cell stacks, when the system temperature is less than the predetermined temperature and the system current is less than the predetermined threshold value, any one of the first and second fuel cell stacks is operated for the predetermined time at the higher gas pressure than the other fuel cell stack. By the first step, a temporary pressure difference is produced between the two fuel cell stacks. Thereby, droplets present in the flow paths are easily discharged. Also, the fuel gas is not wasted since the pressure change is caused in the closed fuel gas circulation system.

When the system temperature is equal to or more than the predetermined temperature and/or the system current is equal to or more than the predetermined threshold value, the normal operation mode may be continued.

The fuel cell stack selected by the controller and operated at the higher gas pressure in the first step, is not particularly limited. It may be the fuel cell stack which has a shorter history of operation at a high gas pressure. Accordingly, the lifetime of the fuel cell stacks can be averaged.

The system temperature serves as an indicator to judge whether or not the temperature of the stacks in the system is appropriate.

The predetermined temperature of the system temperature is not particularly limited. For example, the system temperature at the time when flooding occurs, is measured in advance. From the measured system temperature, the system temperature at which flooding is likely to occur, may be appropriately determined considering the performance of the fuel cell system. For example, when the system temperature decreases to less than 70° C., water vapor condensation occurs in the fuel-based gas flow path, and flooding is likely to occur.

The timing for detecting the system temperature is not particularly limited. The system temperature may be detected every time a predetermined time elapses after the operation of the fuel cell stacks in the normal operation mode is started, or it may be detected when the operation of the fuel cell stacks in the normal operation mode is started. During the normal operation mode, the temperature of the fuel cell stacks may be constantly detected. The detection time may be appropriately determined.

Since the system current is proportional to the gas flow rate in the system, it serves as an indicator to judge whether or not the gas flow rate in the system is appropriate. As the system current decreases, the gas flow rate in the system decreases, and an impellent force to push away condensation in the flow path, decreases.

The predetermined threshold value of the system current is not particularly limited. It may be appropriately determined by preparing a data group showing a relationship between the system current and the gas flow rate in advance, and considering the performance of the fuel cell system from the data group.

The timing for detecting the system temperature is not particularly limited. The system temperature may be detected every time a predetermined time elapses after the operation of the fuel cell stacks in the normal operation mode is started, or it may be detected when the operation of the fuel cell stacks in the normal operation mode is started. During the normal operation mode, the temperature of the fuel cell stacks may be constantly detected. The detection time may be appropriately determined.

The timing for detecting the system temperature may be the same as or different from the timing for detecting the system current. For simplicity, they may be the same timing.

The method for operating the fuel cell stack at the higher gas pressure, is not particularly limited. As the method, examples include, but are not limited to, increasing the amount of the fuel gas supplied from the fuel gas supplier, decreasing the frequency of discharging the fuel off-gas to the outside, and postponing the time for discharging the fuel off-gas to the outside.

The predetermined time for operating the fuel cell stack at the higher gas pressure is not particularly limited, as long as it is the time for which a pressure difference can be produced between the two fuel cell stacks. The time may be appropriately determined depending on the performance of the fuel cell stacks.

The gas pressure of the fuel cell stack operated at the higher gas pressure is not particularly limited, as long as it is higher than the gas pressure of the other fuel cell stack. The gas pressure may be a predetermined gas pressure. That is, the fuel cell stack may be operated at a predetermined gas pressure higher than the gas pressure of the normal operation mode.

The predetermined gas pressure may be determined considering the performance of the fuel cell system, etc.

The circulation gas flow rate of the fuel cell stack not operated at the higher gas pressure in the first step, may be larger than that of the fuel cell stack operated at the higher gas pressure. Accordingly, a fuel gas shortage caused by poor fuel gas distribution between the fuel electrodes of the unit cells in the stacks, which is due to a decrease in the partial pressure of the fuel electrodes, is suppressed.

It takes a certain amount of time to bring the normal gas pressure of the fuel cell stack to high gas pressure. Accordingly, to eliminate flooding as quick as possible when it occurs, it is judged from the system temperature and system current whether or not flooding is likely to occur soon. Then, when it is judged that flooding is likely to occur, one of the two fuel cell stacks is operated at high pressure to produce a pressure difference between the stacks. Accordingly, momentum to push away the condensed water accumulated in the fuel-based gas flow path, can be increased so that flooding can be quickly eliminated when the voltage of the stacks is measured and it is judged that flooding is actually occurring.

(2) Second Step

The second step executed by the controller is the following step: when the stack voltage of at least any one of the first and second fuel cell stacks is below the predetermined voltage value after the first step, the first on-off valve is opened if the fuel cell stack operated at the higher gas pressure in the first step is the first fuel cell stack, and the second on-off valve is opened if the fuel cell stack operated at the higher gas pressure in the first step is the second fuel cell stack.

When the voltage of both the first and second fuel cell stacks is equal to or more than the predetermined voltage value, the first step may be continued, or the fuel cell stacks may return to the normal operation mode.

Once flooding occurs in the fuel-based gas flow path, the flow rate of the fuel-based gas decreases to decrease the stack voltage. Accordingly, the stack voltage serves as an indicator to judge whether or not flooding is occurring.

The predetermined voltage value of the stack voltage is not particularly limited. For example, the stack voltage is measured in advance when flooding occurs. From the measured stack voltage, the stack voltage value may be appropriately determined considering the performance of the fuel cell system.

The timing for detecting the stack voltage is not particularly limited. In the first step, the stack voltage may be detected every time a predetermined time elapses after the first step is started. The stack voltage may be also detected when the first step is started. In the first step, the voltage of the fuel cell stacks may be constantly detected. In the second step, the stack voltage may be detected every time a predetermined time elapses after the second step is started. The stack voltage may be also detected when the second step is started. In the second step, the voltage of the fuel cell stacks may be constantly detected. The detection time may be appropriately determined.

After the fuel cell stacks are operated with a pressure difference in the first step, the on-off valve of the fuel cell stack operated at the higher gas pressure is opened in the second step, and thereby flooding is quickly eliminated.

(3) Third Step

The third step executed by the controller is the following step: the gas flow rate of the first fuel cell stack is increased when the voltage of the first fuel cell stack is below the predetermined voltage value after the second step, and the gas flow rate of the second fuel cell stack is increased when the voltage of the second fuel cell stack is below the predetermined voltage value after the second step, and then the on-off valve opened in the second step is closed. By closing the on-off valve opened in the second step, the fuel cell stacks return to the normal operation mode. When the voltage of both the first and second fuel cell stacks is equal to or more than the predetermined voltage value, the on-off valve opened in the second step is closed; the fuel cell stacks return to the normal operation mode; and the controller terminates the control. When the voltage of only the first fuel cell stack is below the predetermined voltage value, the gas flow rate of only the first fuel cell stack is increased, and the gas flow rate of the second fuel cell stack is not increased; then, the on-off valve opened in the second step is closed; the fuel cell stacks return to the normal operation mode; and the controller terminates the control. Also, when the voltage of only the second fuel cell stack is below the predetermined voltage value, the gas flow rate of only the second fuel cell stack is increased, and the gas flow rate of the first fuel cell stack is not increased; then, the on-off valve opened in the second step is closed; the fuel cell stacks return to the normal operation mode; and the controller terminates the control.

The third step is the following step: the condensed water is tried to be removed from the fuel-based gas flow path by opening the on-off valve and using the differential pressure between the fuel cell stacks, and if the stack voltage does not return to the predetermined voltage value or more and it is judged that flooding is not eliminated, flooding is eliminated by increasing the fuel gas flow rate by a conventionally-known method.

The timing for closing the on-off valve may be the time at which the voltage of the fuel cell stack is equal to or more than the predetermined voltage value.

REFERENCE SIGNS LIST

11. First fuel cell stack
12. First supply flow path
13. First circulation flow path
21. Second fuel cell stack
22. Second supply flow path
23. Second circulation flow path
30. Fuel gas supplier
41. First on-off valve
42. First bypass flow path
43. Second on-off valve
44. Second bypass flow path
50. Controller
51. Temperature detector
52. Current detector
53. Voltage detector
100. Fuel cell system

The invention claimed is:

1. A fuel cell system comprising:
a first fuel cell stack,
a second fuel cell stack,
a fuel gas supplier which supplies fuel gas to the first and second fuel cell stacks,
a first supply flow path which connects the fuel gas supplier and the first fuel cell stack,
a first circulation flow path which recovers first fuel off-gas discharged from fuel electrodes of the first fuel cell stack and returns the first fuel off-gas as first circulation gas to the first fuel cell stack,
a second supply flow path which connects the fuel gas supplier and the second fuel cell stack,
a second circulation flow path which recovers second fuel off-gas discharged from fuel electrodes of the second fuel cell stack and returns the second fuel off-gas as second circulation gas to the second fuel cell stack,
a first bypass flow path which includes a first on-off valve and which connects the first circulation flow path and the second supply flow path, bypasses the first fuel cell stack and supplies the first circulation gas to the second fuel cell stack,
a second bypass flow path which includes a second on-off valve and which connects the second circulation flow path and the first supply flow path, bypasses the second fuel cell stack and supplies the second circulation gas to the first fuel cell stack,
a temperature detector which detects a system temperature,
a current detector which detects a system current,
a voltage detector which detects a stack voltage, and
a controller,
wherein the controller closes the first and second on-off valves in a normal operation mode;
wherein the controller executes a first step in which, when the system temperature is less than a predetermined temperature and the system current is less than a predetermined threshold value, any one of the first and second fuel cell stacks is operated for a predetermined time at a higher gas pressure than the other fuel cell stack; and
wherein the controller executes a second step in which, when the stack voltage of at least any one of the first and second fuel cell stacks is below a predetermined voltage value after the first step, the first on-off valve is opened if the fuel cell stack operated at the higher gas pressure in the first step is the first fuel cell stack, and the second on-off valve is opened if the fuel cell stack operated at the higher gas pressure in the first step is the second fuel cell stack.

2. The fuel cell system according to claim 1, wherein the fuel cell stack operated at the higher gas pressure in the first step, is the fuel cell stack which has a shorter history of operation at a high gas pressure.

3. The fuel cell system according to claim 1,
wherein the controller executes a third step in which a gas flow rate of the first fuel cell stack is increased when the voltage of the first fuel cell stack is below the predetermined voltage value after the second step, and a gas flow rate of the second fuel cell stack is increased when the voltage of the second fuel cell stack is below the predetermined voltage value after the second step, and then the on-off valve opened in the second step is closed.

* * * * *